United States Patent [19]

Weiler

[11] Patent Number: 4,486,307

[45] Date of Patent: Dec. 4, 1984

[54] FILTER APPARATUS HAVING FILTER BED BACK-WASHING MEANS

[75] Inventor: Walter Weiler, Diez, Fed. Rep. of Germany

[73] Assignee: Passavant-Werke AG & Co. KG, Fed. Rep. of Germany

[21] Appl. No.: 417,033

[22] Filed: Sep. 13, 1982

[30] Foreign Application Priority Data

Sep. 29, 1981 [DE] Fed. Rep. of Germany ....... 3138676

[51] Int. Cl.³ .............................................. B01D 23/24
[52] U.S. Cl. ..................................... 210/275; 210/793
[58] Field of Search ............... 210/275, 278, 793, 672, 210/678, 795

[56] References Cited

U.S. PATENT DOCUMENTS

| 1,718,767 | 6/1929 | Wade | 210/793 |
| 2,302,449 | 11/1942 | Laughan | 210/275 X |
| 3,984,326 | 10/1976 | Bendel | 210/275 X |
| 4,377,485 | 3/1983 | Krofta | 210/275 X |

Primary Examiner—Frank Spear
Attorney, Agent, or Firm—Woodford R. Thompson, Jr.

[57] ABSTRACT

Filter apparatus embodying a filter bed back-washing unit comprising a raisable and lowerable suction bell, the side walls of which define division walls to compart the respective partial volume of the filter bed to be cleaned. The side walls of the suction bell are of a height at least equal to the height of the filter bed, and the suction bell is raisable and lowerable by a stroke length which corresponds at least approximately to this height.

8 Claims, 1 Drawing Figure

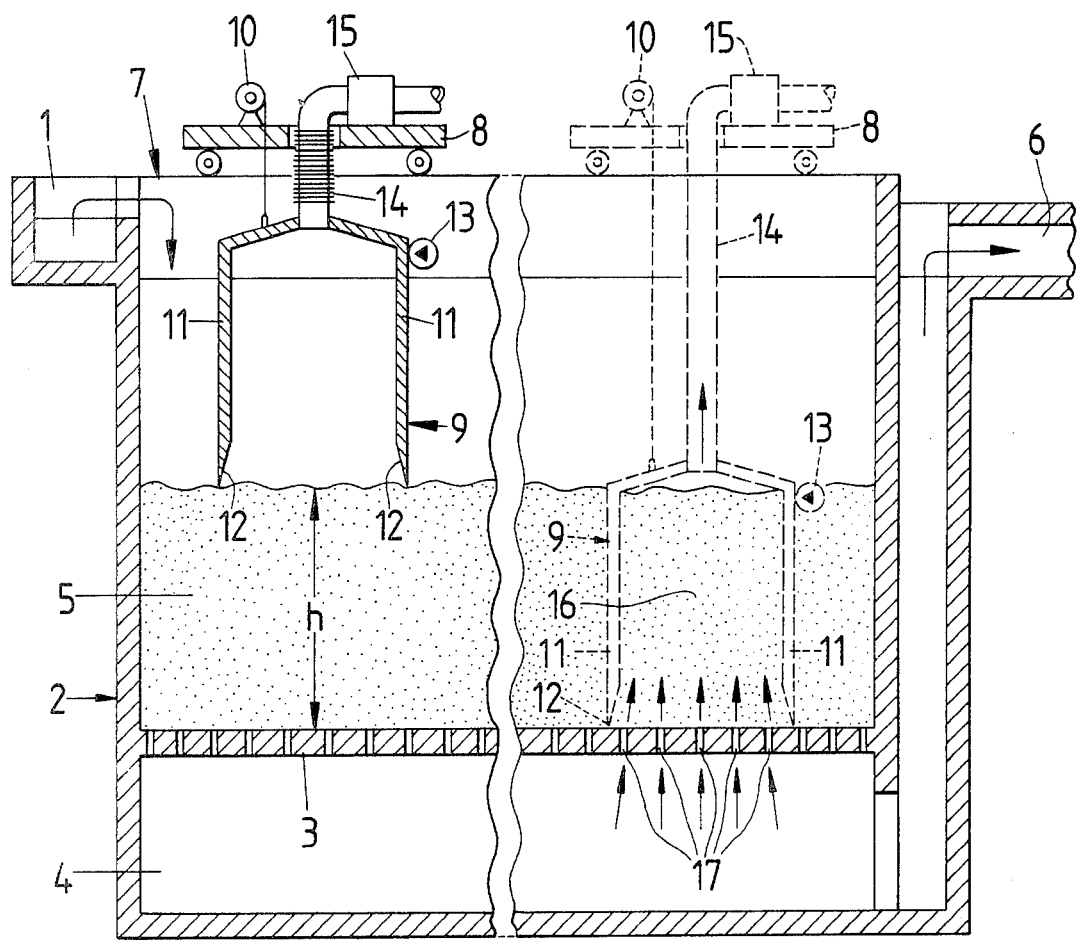

FILTER APPARATUS HAVING FILTER BED BACK-WASHING MEANS

BACKGROUND OF THE INVENTION

This invention relates to filter apparatus adapted for use with a basin connected to a crude water intake and having a bottom which is permeable to liquids, lies above a filtrate chamber and supports a filter bed. The apparatus also embodies a raisable and lowerable suction bell which is connected to a suction unit and is transportable horizontally through the basin in a raised position above the filter bed and is lowerable into an operable position in which it back-washes a partial volume of the filter bed by the suction action of the suction unit sucking back or withdrawing the filtrate from the filtrate chamber.

Filter apparatus of this type is disclosed in German Offenlegungsschrift No. 2,455,172. A disadvantage of this type filter apparatus is that the basin must be subdivided into compartments in order to be able to apply the suction bell of the apparatus for back-washing the filter bed. The stationary division walls, which are necessary for this purpose, complicate and increase the cost of construction of the basin considerably. Furthermore, all of these compartments should lie in the same plan so that one and the same suction bell can be used for back-washing all the compartments. Such an arrangement is virtually impracticable, particularly for circular basins, because the only conceivable regular subdivision of a circular basin would be in the form of circular sectors.

In sector-shaped compartments the filter bed would be even more inefficient, particularly in the acute angle. Also, due to the nonuniform suction action in such compartments, they would be cleaned unevenly in the back-washing process. It will thus be seen that filter apparatus adapted for use in a circular basin cannot be equipped with such suction units for back-washing the filter bed, unless suction bells of different shapes are used for compartments of different shapes, which would be unsatisfactory due to economic considerations.

Since stationary division walls heretofore used to subdivide filter apparatus basins can be installed subsequently in already existing basins only at high cost, only new filter apparatus can be provided with a filter bed back-washing suction unit which has advantages over other filter bed cleaning devices.

SUMMARY OF THE INVENTION

The object of the present invention is to provide filter apparatus of the type mentioned above having a universally useful filter bed back-washing unit, without having to impose any requirements on the basin as regards shape and subdivision. This object is achieved according to the invention by providing a filter unit of the type mentioned above, wherein the side walls of a suction bell define division walls to compart the respective partial volume of the filter bed to be cleaned. The height of the side walls of the suction bell should preferably be approximately equal to the height of the filter bed, and the suction bell should be raisable and lowerable by a stroke length which corresponds approximately to the height of the filter bed. However, it is also possible to make the side walls of the suction bell shorter and then not lower them completely into the filter bed. In this case some filtrate from the adjacent sections enters the suction bell in the lower region of the filter bed; however, this does not prejudice the normal filter operation.

Means to force or stab the side walls of the suction bell into the filter bed are advantageously provided. For example, sharp stabbing edges may be provided on the lower edges of the suction bell side walls and means for compressive loading of the suction bell, such as an additional loading weight of the bell may be employed. A vibrator may also be carried by the suction bell to aid in bringing about the stabbing action. The lower edges of the side walls themselves may be used for the subsequent smoothing of the filter bed after back-washing the filter bed.

DESCRIPTION OF THE DRAWING

Filter apparatus embodying features of this invention is shown in the accompanying drawing in which the single FIGURE is a vertical sectional view showing the suction bell in the inoperative position in solid lines and showing the suction bell in the operative position in dotted lines.

DETAILED DESCRIPTION

The filter apparatus illustrated in the single FIGURE consists of a basin 2 connected to a crude water intake 1 and having a bottom 3 which is permeable to liquids and is mounted above a filtrate chamber 4. The liquid permeable bottom 3 supports a filter bed 5, such as sand, having a layer height h. The filtrate chamber 4 communicates with a filtrate drain 6, through which the filtrate, such as water purified by the filter bed, is discharged. The basin 2 may be circular or angular, as viewed from above.

Mounted for travel along the basin edge 7, or on rails provided at the upper edge of the basin edge, is a bridge 8 which carries a suction bell 9 that is raised and lowered by a lifting device 10. The suction bell 9 may be circular, square or rectangular as viewed in cross-section depending upon the shape of the basin, as viewed in plan. Preferably, the side walls 11 of the suction bell 9 are of a height which is at least equal to the height "h" of the filter bed 5. In the raised position, the suction bell 9 should be located above the filter bed 5, as shown in solid lines at the left side of the drawing.

In order to clean the filter bed 5, after a certain period of use, of the suspended matter filtered out of the crude water to be purified, the suction bell 9 is lowered into the operative position illustrated in dotted lines at the right-hand side of the drawing. In order to facilitate the penetration or stabbing of the lower edges of the side walls 11 of the suction bell 9 into the filter bed 5, the side walls are provided with sharp stabbing edges 12. In addition, a vibrator 13 is arranged on the top side of the suction bell. The stabbing action of the lower edges of the side walls 11 may also be facilitated by providing means to exert a compressive loading force or an additional loading weight on the suction bell.

The suction bell 9 is connected by extensible means, such as a bellows type conduit 14 to a suction pump 15 mounted on the bridge 8. The suspended matter exhausted out of the partial volume 16 of the filter bed being cleaned in the lowered suction bell 9 is discharged through the bellows-type conduit. At the same time, this suction action sucks water out of the filtrate chamber 4 through the orifices 17 which make the bottom 3 permeable to liquids. Accordingly, as the partial volume 16 of the filter bed located in the suction bell is washed, the sand of the filter bed 5 is loosened and eddied whereby the suspended matter retained in the respective partial volume 16 is loosened and exhausted by the suction action of the pump 15.

By moving the suction bell 9 in the raised state and then lowering it at a new location, it is possible for the entire filter bed 5 in the basin to be cleaned step-by-step, without the necessity of sub-dividing the basin into compartments having stationary walls. A circular suction bell, as viewed in cross-section, is recommended for back-washing circular basins, while the suction bell may be circular or rectangular for other types of basins. As will readily be seen from the above description, the filter bed back-washing unit provided in accordance with this invention can also be installed subsequently on already existing basins in a simple manner.

In order to smooth the surface of the filter bed after it has been disturbed by the repeated stabbing of the suction bell, a suitable beam may be provided, or the smoothing action can be effected by transporting the raised suction bell by means of the bridge with the lower edges 12 of the suction bell side walls performing the smoothing function.

What I claim is:

1. The combination with filter apparatus embodying a basin connected to a crude water intake and having a liquid permeable bottom lying above a filtrate chamber and supporting a filter bed, the improvement in a back washing unit for the filter bed comprising: a raisable and lowerable suction bell connected to a suction unit, means for transporting said suction bell horizontally through the basin in a raised position above the filter bed, means for lowering said suction bell into an operable position within the filter bed to back-wash a partial volume of the filter bed by the suction action of said suction unit withdrawing filtrate from the filtrate chamber with the side walls of said suction bell defining division walls to compart the respective partial volume of the filter bed to be cleaned.

2. Apparatus as defined in claim 1 in which the height of the side walls of the suction bell is at least equal to the height of the filter bed and the suction bell is raisable and lowerable by a stroke length which corresponds at least approximately to the height of the filter bed.

3. Apparatus as defined in claim 1 or 2 in which means is provided to cause a stabbing of the side walls of the suction bell into the filter bed.

4. Apparatus as defined in claim 3 in which sharp stabbing edges are provided on the lower edges of the side walls of the suction bell.

5. Apparatus as defined in claim 3 in which the suction bell is provided with means to exert a compressive loading on said suction bell.

6. Apparatus as defined in claim 5 in which the suction bell provides an additional loading weight which exerts said compressive loading on the suction bell.

7. Apparatus as defined in claim 3 in which a vibrator is provided on the suction bell.

8. Apparatus as defined in claim 1 in which a smoother is carried by the suction bell to smooth the surface of the filter bed.

* * * * *